Feb. 20, 1934.  E. V. TAYLOR  1,947,886
BRAKE MECHANISM
Filed July 26, 1930   2 Sheets-Sheet 1

INVENTOR.
EUGENE V. TAYLOR
BY *M.W.McConkey*
ATTORNEY

Feb. 20, 1934.  E. V. TAYLOR  1,947,886
BRAKE MECHANISM
Filed July 26, 1930  2 Sheets-Sheet 2

INVENTOR.
EUGENE V. TAYLOR
BY
ATTORNEY

Patented Feb. 20, 1934

1,947,886

UNITED STATES PATENT OFFICE 1,947,886

BRAKE MECHANISM

Eugene V. Taylor, Chicago, Ill., assignor to Bendix Brake Company, South Bend, Ind., a corporation of Illinois Application July 26, 1930. Serial No. 470,795

21 Claims. (Cl. 188—78)

This invention relates to brakes and is illustrated as embodied in an internal expanding automobile brake.

One object of the invention is to provide a novel cam or wedging device that will force the brake shoe outwardly against the drum regardless of the direction of drum rotation.

According to an important feature of the invention the brake shoe is provided with a pair of cam devices having oppositely inclined slots or faces embracing or contacting with a pin secured to the brake shoe. Each slotted member is stationary in one direction and movable in the other, the movement being in opposite directions to permit the cam to follow the slot of the stationary member, which may be termed the operative member, without binding in the slot of the other member.

Each of the slotted members is operative in one direction only, the operative member being determined by the direction of rotation of the brake drum.

Another object of the invention is to provide a caming device for a brake shoe that will return the shoe to its idle position subsequent to a brake application resulting in angular movement of the shoe.

The above and other objects and features of the invention, including various novel and desirable details of constructions, will be apparent from the following description of several illustrative embodiments shown in the accompanying drawings, in which.

Figure 1:
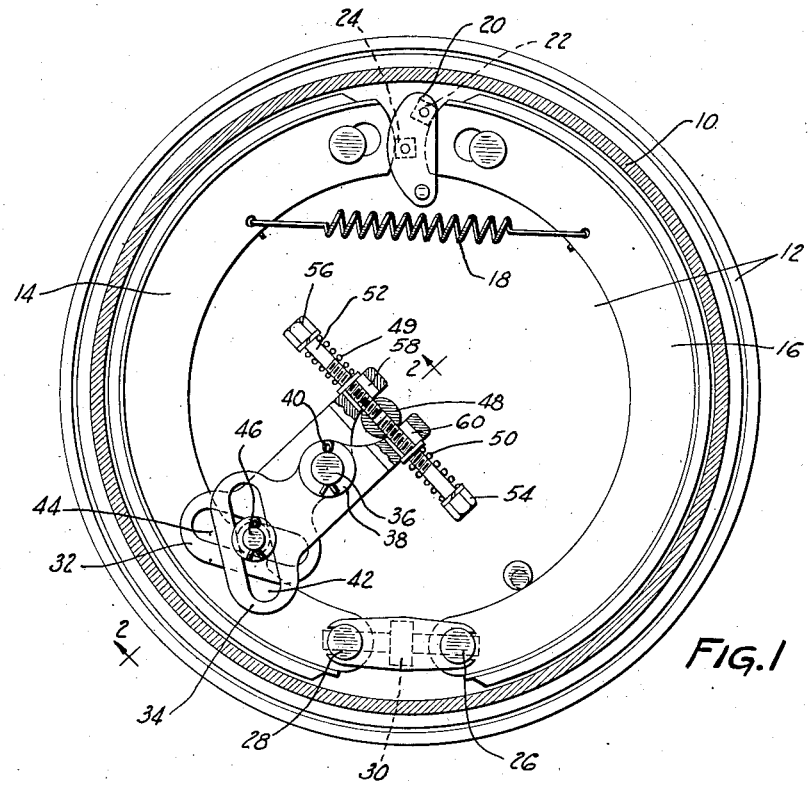
Figure 1 is a vertical section of a brake, taken just inside the head of the brake drum showing the novel wedging device.
Figure 2:
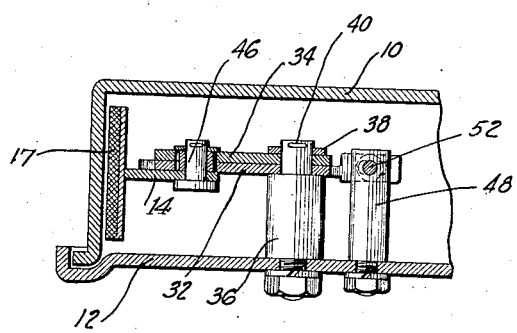
Figure 2 is a sectional view taken on line 2—2 of Figure 1 showing the manner in which the cam members are secured to the backing plate.

In the brake illustrated in Figures 1 and 2, 10 is a brake drum at the open side of which is mounted a backing plate 12, enclosing friction means such as brake shoes 14 and 16 having lining 17. The brake is applied against the resistance of spring 18 by expanding the ends of the shoes 14 and 16 by a floating cam member 20 having contact with the adjacent ends of shoes 14 and 16 through blocks 22 and 24. Shoes 14 and 16 are of the floating type and are pivotally connected at their lower ends by pins 26 and 28 through an adjusting screw 30.

In the application of the brake either shoe 14 or 16 may become the servo shoe, depending on the direction of rotation of the drum, thus if the drum is turning in a counterclockwise direction, shoe 14 is the servo shoe and shoe 16 is the secondary shoe.

In some cases, it is desirable to provide an auxiliary wedging device for urging one of the shoes against the drum at a point remote from the applying cam 20. The auxiliary wedging device in Figures 1 and 2 includes a pair of slotted levers 32 and 34 pivotally mounted to the backing plate 12 by a stud 36, a washer 38 and cotter pin 40 being used to hold the slotted members on the stud.

Slotted member 34 is formed at its outer end with an inclined slot 42. Member 32 is formed with a slot 44 arranged in crossing relation to slot 42 and encompassing a pin or projection 46 secured to the shoe 14. The opposite ends of members 32 and 34 are projected inwardly to embrace a stud or stop 48 against which they are urged by springs 49 and 50, surrounding guide rod 52 and which are compressed between the ends of the slotted members and nuts 54 and 56, clearance holes or slots 58 and 60 being provided in the ends of the slotted members to permit free movement on the rod 52.

In the operation of the brake, assuming that the drum is turning in a counterclockwise direction, when shoe 14 frictionally engages the drum, it will be drawn around with the drum and cause pin 46 to follow the slot 42 and urge the lower end of shoe 14 outwardly against the drum. Pin 46 is free to move along slot 42 in the direction of the drum because slotted member 32 may pivot in the direction of movement and be rotated about its pivotal support 36.

If the drum 10 should be rotating in a clockwise direction, pin 46 will move toward the drum along slot 44, slotted member 34 being free to pivot in the direction of movement and allow the pin to follow the slot. It may readily be seen from the above description that I have provided an auxiliary brake shoe wedging means that will urge the brake shoe outwardly regardless of the direction of rotation and which will return the brake to its idle position by reason of the coacting cross slots 42 and 44 which bear on four sides of the pivot 46 and resiliently hold shoes 14 and 16 in the position illustrated in Figure 1.

Figure 3:
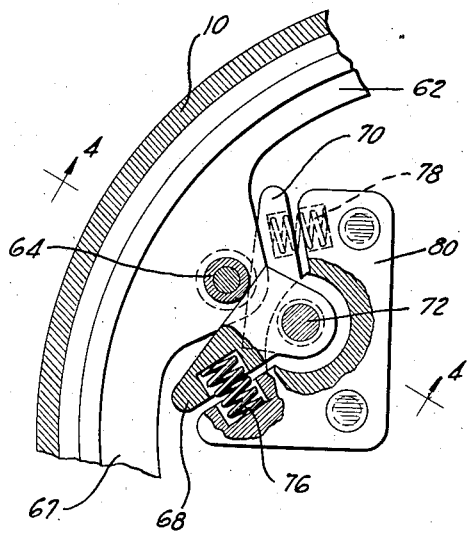
Figure 3 is a fragmental view showing a modified form of the wedging device.
Figure 4:
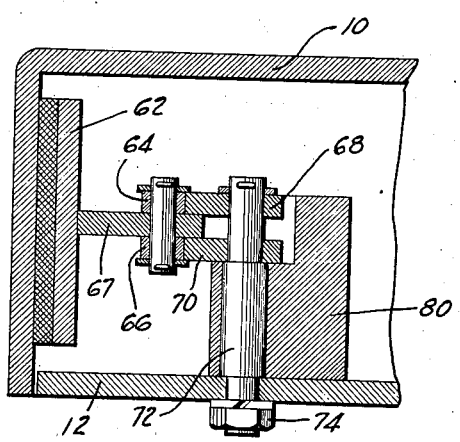
Figure 4 is a sectional view taken on lines 4—4 of Figure 3.

In the form of the invention shown in Figures 3 and 4, 62 is a brake shoe corresponding to shoe 14 of Figure 1 to which are attached rollers 64 and 66 arranged on opposite sides of the web 67 in engagement with cam members 68 and 70. The cam members are each pivotally mounted on a stud 72 secured to the backing plate 12 by nut 74. A bracket member 80 is also secured to the plate 12 by the stud 72 which acts as a stop for lever members 68 and 70, springs 76 and 78 being interposed in corresponding sockets formed in the levers and the bracket respectively.

In the operation of the form shown in Figures 3 and 4, if the drum be rotated in a counterclockwise direction, roller 64 will engage the cam surface of member 68 and rotate it against the resistance of spring 78 until it contacts with bracket 80, after which, shoe 62 will be forced outwardly into engagement with drum 10.

In the reverse direction of rotation, roller 66 will engage lever 70 and rotate it until it engages the stop bracket 80 when the action will again be to force shoe 62 into engagement with the drum.

While I have illustrated and described certain embodiments of my invention, it is understood that I do not desire that the invention should be limited to the form shown and described or otherwise, except as defined by the terms of the following claims.

I claim:

1. A brake comprising, a drum, friction means for engaging the drum, an actuating member therefor, and a wedging device across the drum from the actuating member and comprising a pair of inclined adjacent relatively adjustable cam members on which the friction means slidably wedges when the brake is applied and which are adapted to force the friction means against the drum.

2. A brake comprising a drum, friction means for engaging the drum, an actuating member therefor, and a wedging device comprising a pair of superposed inclined adjacent cam members moved relatively to each other by the friction means when the brake is applied and which are adapted to force the friction means against the drum.

3. A brake comprising a drum, friction means for engaging the drum, an actuating member therefor and a wedging device comprising a pair of yieldingly-connected members rockable about a common pivot and adapted to force the friction means against the drum.

4. A brake comprising a drum, friction means for engaging the drum, an actuating member therefor and a wedging device comprising a pair of members having oppositely inclined cam surfaces rockable about a common pivot and adapted to force the friction means against the drum.

5. A brake comprising a drum, friction means therefor, an actuating member for the friction means, and a wedging device for the friction means including a pair of yieldingly-connected members having oppositely inclined cam surfaces engaging the same portion of the friction means.

6. A brake comprising a support, a drum, friction means therefor, an actuating member for the friction means, and a wedging device for the friction means including a pair of members fulcrumed on the support having oppositely inclined cam surfaces engaging the same portion of the friction means.

7. A brake comprising, a support, a drum, friction means adapted to engage the drum, an actuating member for the friction means, a pair of slotted members fulcrumed on the support having their slots in crossing relation, a projection on the friction means engaging the slots, and means for alternately holding each slotted member stationary while the other member is free to move about its fulcrum.

8. A brake comprising, a support, a drum, friction means adapted to engage the drum, an actuating member for the friction means, a pair of slotted members fulcrumed on the support having their slots in crossing relation, a projection on the friction means engaging the slots, a single stop for alternately holding each slotted member stationary while the other member is free to move about its fulcrum, and means for urging the slotted members against the stop.

9. A brake comprising, a drum, a support, friction means adapted to engage the drum, an actuating member therefor, a pair of members having cam surfaces pivoted on the support, extensions on the cam members arranged on opposite sides of a stop secured to the support, a projection on the friction means engaging both cam members, and said cam members being adapted to move in opposite directions from the stop.

10. A brake comprising a drum, a support, friction means adapted to engage the drum, an actuating member therefor, a pair of members having cam surfaces pivoted on the support, extensions on the cam members arranged on opposite sides of a stop secured to the support, a projection on the friction means engaging both cam members, said cam members being adapted to move in opposite directions from the stop, and resilient means for urging the cam members against the stop.

11. A brake comprising, a drum, a support, friction means adapted to engage the drum, an actuating member therefor, and a wedging device for the friction means comprising a pair of members pivoted on the support having slots in crossing relation, a projection on the friction means within said slots, said slotted members having free movement in opposite directions, and a stop for arresting movement of each of the members in one direction and causing the slots to force the friction means against the drum.

12. A brake comprising, a drum, friction means adapted to engage the drum, an actuating member therefor, and a wedging device for the friction means comprising a pair of members having slots in crossing relation, a projection on the friction means within said slots, said slotted members having free movement in opposite directions, and a stop for arresting movement of each of the members in one direction and causing the slots to force the friction means against the drum.

13. A brake comprising a rotatable drum, friction means therefor, an actuating member for the friction means, and an auxiliary wedging device including a pair of pivotal members having crossing slots engaging a projection on the friction means, and means causing one slot to force the shoe outwardly when the drum is rotating in one direction and the other slot to force the shoe outwardly in the reverse direction of the drum.

14. A brake comprising, a drum, friction means therefor, an actuating member for the friction means, a support and an auxiliary wedging device comprising a pair of members having inclined slots arranged in crossing relation, a projection on the friction means in engagement with both slots at their intersection, said slotted members having a pivotal connection to the support and having projections arranged on opposite sides of a stop.

15. A brake comprising, a drum, friction means therefor, an actuating member for the friction means, a support, and an auxiliary wedging device comprising a pair of members having inclined slots arranged in crossing relation, and a projection on the friction means in engagement with both slots at their intersection.

16. A brake comprising a support, a drum, friction means therefor, an actuating device for the friction means, an auxiliary wedging device, including a pair of cam members pivotally mounted on the support with their cam surfaces inclined to each other in overlapping relation, a projection on the shoe contacting both cam surfaces, and a stop for each member.

17. A brake comprising a support, a drum, friction means therefor, an actuating device for the friction means, an auxiliary wedging device, including a pair of cam members pivotally mounted on the support with their cam surfaces inclined to each other in overlapping relation, a projection on the friction means contacting both cam surfaces, a stop for each member and a compression spring between each cam member and the stop.

18. A wedging device for a brake or the like comprising a pair of adjacent members having inclined slots at the ends at one side of their centers, a stop between the opposite ends, and means yieldingly urging said opposite ends against the stop.

19. A wedging device for a brake or the like comprising a pair of adjacent members having inclined slots at the ends at one side of their centers, and means yieldingly urging the opposite ends toward each other.

20. A wedge device for a brake or the like comprising superposed members each having an inclined surface at one end, a fulcrum adjacent its center, and means for receiving a holding spring adjacent its other end.

21. A wedge device comprising a member having an inclined surface at one end and a fulcrum adjacent its center, and a stop adjacent its other end, and a spring urging said other end against the stop.

EUGENE V. TAYLOR.